(12) United States Patent
Dreher

(10) Patent No.: US 7,387,590 B2
(45) Date of Patent: Jun. 17, 2008

(54) MOTOR VEHICLE GEAR DEVICE AS WELL AS METHOD FOR CONTROL OF A MOTOR VEHICLE

(75) Inventor: Felix Dreher, Buehl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 244 days.

(21) Appl. No.: 11/205,518

(22) Filed: Aug. 17, 2005

(65) Prior Publication Data

US 2006/0040787 A1 Feb. 23, 2006

(30) Foreign Application Priority Data

Aug. 19, 2004 (DE) ...................... 10 2004 040 202

(51) Int. Cl.
*F16H 61/08* (2006.01)
*B60W 10/02* (2006.01)
*B60W 10/06* (2006.01)
*B60W 10/10* (2006.01)

(52) U.S. Cl. ..................... 477/77; 477/124; 74/340
(58) Field of Classification Search ............... 74/340; 477/70, 77, 79, 85, 124, 901

See application file for complete search history.

(56) References Cited

U.S. PATENT DOCUMENTS 6,530,861 B1 * 3/2003 Nakashima ................ 477/85
2002/0092372 A1 * 7/2002 Bowen ....................... 74/339

* cited by examiner

*Primary Examiner*—Richard M. Lorence
*Assistant Examiner*—Edwin A Young
(74) *Attorney, Agent, or Firm*—Simpson & Simpson, PLLC

(57) ABSTRACT

A method for operating a motor vehicle after receiving an acceleration signal in which the motor vehicle power train includes first and the second torque transmission devices connected to first and second subgears. The operational method includes selecting and engaging a predetermined target gear in one of the two subgears and selection and engagement of a predetermined intermediate target gear, in the other of the two subgears, while the power train continues to remain engaged. The intermediate target gear is so chosen that it will be higher than the target gear, so that the rpm of the gear input shaft of the target subgear, will be greater than the rpm of the gear input shaft of the intermediate target subgear, in which the current gear is engaged.

22 Claims, 2 Drawing Sheets

MOTOR VEHICLE GEAR DEVICE AS WELL AS METHOD FOR CONTROL OF A MOTOR VEHICLE

CROSS REFERENCE TO RELATED APPLICATIONS

This application claims priority of German Patent Application No. 10 2004 040 202.7, filed Aug. 19, 2004, which application is incorporated herein by reference.

FIELD OF THE INVENTION

This invention relates to a method for operating a motor vehicle and, in particular, a control of a gear device of a motor vehicle that is preferably designed as a dual clutch gear, dual as well as a motor vehicle gear device that is designed as a double clutch gear.

BACKGROUND OF THE INVENTION

Automated gears for motor vehicles are already known. Such automated gears have an electronic control unit or an electronic control to control gear change processes. As a rule, this electronic control unit or this electronic control is in a signal connection with one or several actors. Such actors as a rule in each case have an electric motor. Furthermore, the actors can be hydraulic or pneumatic switching cylinders that are impacted with pressure by a pressure supply unit by means of a corresponding circuit arrangement of valves. The electronic control unit or the electronic control will then trigger these actors in that, for example, the electric motors or the power supply of such electric motors or valves and their pressure supply devices will be impacted with the corresponding control signals. These actors can then be used to engage and disengage gears. It is furthermore known that clutches, such as starter clutches or the like, can be triggered electronically especially by means of electrical, hydraulic, or hydrostatic actors, specifically, also in the context of the engagement and disengagement of gears and/or for interrupting or locking the power train of the motor vehicle or of segments or branches of the power train.

It is furthermore known that, in motor vehicle gear devices, and especially, in automated gears, one can precisely design a power train branch as, for example, in an automated gear shift (ASG) or several, especially two parallel connected power train branches, such as, for example, in a dual clutch gear (DKG) or a parallel gear box (PSG) or automatic gear box that can be engaged or disengaged under load (uninterruptible gear box; USG) or in an automated gear box supported by an electrical machine (ESG).

Applicant—at least in-house—furthermore knows that, to improve driving comfort in the case of automated gears, depending on practical application, in several or all gears, the drive train is opened by the clutch or by the clutches, the moment the driver turns on traction operation, for instance, by reducing the driver pedal position or when driving downhill, in order to prevent the motor or the combustion engine from being driven by the movement of the vehicle. Consequently, the engine rpm will drop, while the input shaft rpm will follow the speed that will be set while the vehicle rolls. This functional mode is referred to as free wheels or neutral idle.

In current uses—which are known to the applicant at least on an in-house basis—the gear selection during free wheels or neutral idle is not changed; in other words, a target gear is always engaged which will ensure an input shaft rpm that will be definitely above the idling rpm (for a diesel engine, this would be typically 2,000+/-500 rpm). If the free wheels or neutral idle is to be left in the direction of traction operation, because the driver increases the load lifting position, then one can engage only after the engine rpm has risen above the input shaft rpm; otherwise, even though the driver would like to accelerate, it would, for a short time, first of all switch to thrust operation, in other words, the vehicle would be briefly decelerated.

Until the engine rpm has risen above the input shaft rpm, no moment is transmitted in the procedure just described, in other words, the vehicle is not accelerated either. The delay between the acceleration requirement for the actual onset of acceleration is felt to be a disturbing factor, especially in turbo-diesel engines whose rpm, on account of the special engine characteristic ("turbo gap"), even when the drive train is engaged, will react only relatively sluggishly to this increase in the driver pedal position. That makes the vehicle appear very inert. In known gear software for parallel gear boxes—known to the applicant at least on an in-house basis—both clutches are (almost) kept engaged in case of a requirement for acceleration during idling, until the engine rpm has risen above the rpm of the gear input shaft with the target gear engaged. Thereafter, for reasons of comfort, the clutch that belongs to the target gear is slowly closed and at the same time a negative engine moment engagement is performed in order to avoid any greater engine rpm overshoots. The complete engine moment, required by the driver, is available for the acceleration of the vehicle only definitely (typically about 1.5 seconds) after the pedal value has been increased.

SUMMARY OF THE INVENTION

The object of the invention is to provide a design or a method that will make it possible to accelerate motor vehicles quickly and comfortably when the driver wishes to accelerate with the power train engaged, something that is indicated by the driver for instance by operating a drive pedal.

The invention broadly comprises a method for control of a gear device of a motor vehicle, wherein the gear device is integrated into a motor vehicle power train that can be driven by an engine and is designed as multiple clutch gear, wherein the gear device comprises the following: a first subgear with a first gear input shaft and with several wheel sets for the formation of gears that can be engaged and disengaged, wherein a first torque transmission device is provided upon the first gear input shaft; and; a second subgear with a second gear input shaft and with several wheel sets for the formation of gears that can be engaged and disengaged, wherein a second torque transmission device is provided upon the second gear input shaft, the method including: monitoring a signal which indicates whether there is a desire to accelerate; engaging the power train by releasing the first and second torque transmission devices; selecting and engaging a predetermined target gear in one of the first and second subgears, whereby the power train, during the engagement of the target gear, continues to be engaged; selecting and engaging a predetermined intermediate target gear in the other of the two subgears, wherein the power train, during the engagement of the predetermined intermediate target gear, continues to be engaged, wherein the predetermined intermediate target gear is higher than the target gear, so that the rpm of the gear input shaft of the target subgear, is greater than the rpm of the gear input shaft of the subgear in which the current intermediate target gear is engaged; accelerating the engine; and, locking the torque transmission device that is provided on the gear input shaft of the subgear in which the predetermined intermediate target gear is engaged, when it is found that an acceleration desire is indicated, whereby the torque transmission device is locked only so far that it will slip or that the rpm of the gear that engages the torque transmission device on the engine side will increase faster than the rpm of the gear input shaft of the subgear in which the intermediate target gear is engaged. The invention also broadly comprises a method for the control of a drive system of a motor vehicle, whereby the drive system includes: a power train; an engine for driving the power train; a gear device with several wheel sets, wherein the gear device provides gears that can be engaged and disengaged, wherein the gear device has at least one torque transmission device, by means of which the power train or a particular power train branch can be released and locked; at least one drive shaft that is arranged on the side of the power train facing away from the engine and that can be driven by means of the engine via the power train; an electronic control unit; and, a device by means of which the desire to accelerate can be indicated, the method including: engaging the power train by releasing the at least one torque transmission device to prevent or to shorten the thrust operating phases, when it is ascertained that the motor vehicle leaves a traction operation mode toward a thrust operation mode due to a desire to accelerate; generating at least one signal by means of the electronic control unit before an acceleration desire is indicated, indicating the rpm of an engine output shaft engaging an engaged torque transmission device on the side facing toward the engine is maintained greater than or equal to the rpm of a gear input shaft that engages in the engaged torque transmission device on the side facing away from the engine; and, ensuring, by means of the electronic control unit, that the gear input shaft is connected to the drive shaft via an engaged gear. A further embodiment of the present invention broadly comprise a gear control unit for a motor vehicle device including: an electronic control unit and including a memory; a computer unit; and, a device for transmitting and receiving signals, wherein the device for transmitting and receiving signals transmits signals to control a gear device; and, wherein, in the memory of the electronic control unit, there is stored a control program that, in cooperation with the computer unit and the device for sending and transmitting signals, controls the operation of a gear device of a motor vehicle, wherein the gear device is integrated into a power train of the motor vehicle that can be driven by an engine and is designed as multiple clutch gear; while yet another embodiment of the present invention broadly comprises a motor vehicle with a power train and an engine for driving the power train including: at least one motor vehicle drive shaft arranged on the side of the power train facing away from the engine, the at least one motor vehicle drive shaft being driven by the engine via the power train; a multiple clutch gear in the power train; and, an electronic control unit having a memory, wherein the control unit triggers the multiple clutch gear, whereby the control unit controls a gear device of the multiple clutch gear.

According to the idea behind the invention, there is proposed a method for operating a motor vehicle or for the control of a gear device of a motor vehicle that is designed as a multiple clutch gear or as a dual clutch gear.

Such a dual clutch gear (DKG) is in particular so designed that it has a first subgear as well as a second subgear where the first subgear has a first gear input shaft and where the second subgear has a second gear input shaft. A first torque transmission device is provided here especially on that first gear input shaft of the first subgear. This first torque transmission device is provided especially on this first gear input shaft in terms of the engine as such. The first subgear furthermore has several wheel sets, in particular, toothed wheel sets, for the formation of gears that can be engaged and disengaged. Here it may be provided that these gears, or, in each case, one wheel of these wheel sets, will be arranged on the first engine input shaft.

It is particularly furthermore provided that the second subgear have a second gear input shaft as well as a second torque transmission device that is arranged on that second gear input shaft. This second torque transmission device is arranged especially on the engine. Here, the second subgear furthermore has several wheel sets, in particular, toothed wheel sets, for the formation of gears that can be engaged and disengaged. Here again one can provide that these gears or, in each case, one toothed wheel of the corresponding wheel sets, will be arranged on the second gear input shaft.

The first torque transmission device or the second torque transmission device in each case is so designed that it can be engaged and locked. This first torque transmission device or this second torque transmission device in particular can be a clutch, preferably a friction clutch, or can have such a one. It can be so particularly designed that it can be engaged into a state in which it is completely engaged, as well as a state in which it is so locked that it can in each case essentially completely transmit a current torque that is applied to it. Here it is preferred that this torque transmission device or clutch furthermore can be so locked or released that it can transmit—partly or in a restricted fashion—the current torque that is applied to it. Provision is made here especially that the clutch will slip during that procedure. Other preferred and exemplary embodiments of such a dual clutch gear are also described elsewhere in this disclosure.

In this context however it must be noted that, in place of such a dual clutch gear, one can also use a multiple clutch gear that has more than two clutches or more than two power train drives that are connected parallel. Looking at the current uses in the motor vehicle sector, such multiple clutches with more than two clutches—as far as applicant knows—are not in use and on that score it must be furthermore remarked that the invention is also preferred in conjunction with such designs.

According to the idea behind the invention it is now provided that the power train be engaged by releasing the first and the second torque transmission devices. Of course, one can also provide that the method be started or initiated only once the power train is already released or engaged or once the first and the second torque transmission devices are engaged. In this context, it might be noted, that, looking at such embodiments, that are made as multiple clutch gears with more than three parallel connected power trains, which in this case also have a clutch, all of these clutches are engaged.

The power train is released via this first and this second clutch, in particular when, via the first clutch and the second clutch, no torque can be transmitted, in other words, when the transmissible torque corresponds "0" Nm. But one can also provide that a certain tolerance be permitted in that respect so that the power train or the corresponding clutch will be considered as being engaged also when this corresponding clutch can transmit a very small torque. This very low, transmissible torque here can especially depend on the design of the engine or the internal combustion engine which drives the power train with the gear device. In particular, it can be provided that the power train or the corresponding clutch would be considered as being engaged when the transmissible torque of the particular clutch or of the clutches is less than the drag moment of the engine. In particular, embodiments, where, on the engine side of the particular clutch, additional consumers, for example, air conditioning systems or the like, can be driven by the engine or by the internal combustion engine, it can also be provided that the power train, or the first or the second clutch can be considered as being engaged when the torque, that can be transmitted by the corresponding clutches or, is smaller than the sum of the moments consisting of the engine drag moment and the load moments of such consumers—for instance, air conditioning unit or the like—currently act upon this power train.

It can for instance also be provided that the mentioned "tolerance" is such that the power train or the corresponding torque transmission device will be considered as being engaged when the torque, that can be transmitted by that particular clutch, is less than 50 Nm, preferably less than 40 Nm, particularly preferred less than 30 Nm, especially and particularly preferred less than 20 Nm, especially and particularly preferred less than 10 Nm.

A preferred embodiment provides that this previously mentioned action of engagement—especially, when it is a part of the invention-based method—of the power train takes place by releasing the first and second torque transmission devices while the motor vehicle is moving. One can then also provide that this event takes place when the vehicle is stationary.

It can also be provided that this engagement of the power train, by releasing the first and the second torque transmission devices, will take place apart from gear change procedures or will not be a part of the gear change procedures. In this context it must be however noted that it is preferably already provided anyway that, in this kind of dual clutch gear, the gear change processes take place without any interruption in the traction force so that, as a general rule, both torque transmission devices are not released simultaneously anyway. It is particularly provided—in a particularly preferred embodiment—that the release of the power train take place by releasing the first and the second torques transmission devices to prevent or to shorten the thrust operating phases when it is discovered that—due to a reduction of the driver pedal value—traction operation (of the motor vehicle) is selected in terms of thrust operation.

Here it can be provided for instance, that the first and the second torque transmission devices will be released when already a change to thrust operation has been made—especially initially. But it can also be provided that, for example, on the basis of the rpm or the torque conditions, one determines whether such thrust operation is immediately impending and the first and the second torque transmission devices are released, before this thrust operation actually exists. In a particularly preferred manner it is however also provided that, when it is found that the driving pedal value is reduced, the first and the second torque transmission devices are immediately engaged.

As is known, the positions of the driving pedal as a rule are matched up with driving pedal values that, for instance, are such that, when the driver does not step on the driving pedal, the driving pedal value is "0" and when the driver steps on the driving pedal all the way the value is "1," where by the values increase from "0" to "1" in the intermediate positions.

Let it however also be noted that the method according to this idea behind the invention can be used in preferred designs also regardless of any driving pedal or regardless of any driving pedal values. Nowadays, motor vehicles usually have a driving pedal or a load lever. It can also be provided that the invention-based method according to this basic idea can be employed in vehicles that can be accelerated regardless of any such driving pedal. Furthermore, it can be provided that the method according to this basic idea behind this invention be used in designs that of course do have a driving pedal where, additionally however—for example, by means of an electronic control—the engine can be accelerated or this acceleration can be reversed. This for instance is conceivable in those motor vehicles where there is a signal communication between different motor vehicles or objects outside the motor vehicle, such as, for example, beam barriers or the like. For example, in such a motor vehicle, one can implement a control function mode that represents a kind of spacing control with respect to a vehicle driving ahead of the first vehicle and where one can act on the internal combustion engine also in such a way that this would correspond to a reversal of the driving pedal or the driving pedal value when it is found that an interval with respect to a vehicle driving ahead is becoming too small on account of certain criteria.

According to the invention-based method, in keeping with the basic idea, it is provided that a signal be monitored, which signal indicates whether the driver wishes to accelerate.

This for instance can be a signal that is generated as a function of the position or of the position change of a driving pedal. As indicated earlier, that of course can also be a signal that can be generated independently of such a driving pedal. In a design with a driving pedal, the desire to accelerate for instance can depend on the change in the position of this driving pedal. That for instance can be such that an increase in the driving pedal value or an "additional stepping on" the driving pedal would correspond to a desire to accelerate or would cause a corresponding signal to be displayed. The additional stepping-on. It can be provided that, after such an "additional stepping-on" of the driving pedal the desire to accelerate can be considered to exist until such time as the corresponding torque, rpm, or gear conditions of the motor vehicle have not yet been adapted to the situation indicated by the desire to accelerate.

The following is furthermore provided according to the invention-based method: A predetermined target gear is selected on one of the two subgears and is engaged and, in the other subgear, a predetermined gear is selected and engaged. This gear, that is selected and engaged in the other subgear, is an intermediate target gear or is referred as an intermediate target gear. In this selection and engagement of the target gear or of the intermediate target gear, the power train or the first and the second clutches are still engaged.

The following for instance can be provided: First of all, the intermediate target gear is selected and/or engaged and then the target gear is engaged or selected or, first of all, the target gear is selected or engaged, and then the intermediate target gear is selected or engaged. The following is provided in particularly: The intermediate target gear is so chosen that it will be higher than the target gear or the target gear is so selected that it will be less than the intermediate target gear, so that the rpm of the gear input shaft of the subgear—in which the current target gear is engaged—will be greater than the rpm of the gear input shaft of the subgear, in which the current intermediate target gear is engaged. It is provided, for instance, that the target gear in each case be so selected that it will be possible to drive or start up after the re-engagement of the clutch in the middle rpm range.

The target gear especially can be so selected—also in a supplementary manner—that it is chosen as a function of the current speed of the motor vehicle. The intermediate target gear for example can be so chosen that the rpm of the gear input shaft of the subgear, in which this intermediate target gear is selected, after engagement of this intermediate target gear, is less or would be less than or equal to the rpm of the shaft which on the engine side engages in the torque transmission device, which is arranged on the gear input shaft of this subgear with this intermediate target gear that is chosen in each case or that is to be engaged in each case. Here it is particularly preferred that—if several gears exist in the particular subgear which meet the above mentioned condition—the smallest of these gears is selected as an intermediate target gear.

The shaft, which, in terms of the engine, engages the first torque transmission device of the first subgear, preferably corresponds to the shaft which, in terms of the engine, engages the second torque transmission device of the second gear or which is connected with the latter in an integral fashion. It can be provided that the mentioned shaft be the engine output shaft or a shaft that is firmly connected with the engine output shaft or that has a transmission ratio of 1:1. But it can also be provided that, between the engine output shaft and the mentioned, engine-side shaft, that engages the first or second torque transmission, there be provided one or several transmission steps.

The following is provided in a preferred embodiment: The intermediate target gear is so chosen that the rpm of the gear input shaft of the subgear, in which this intermediate target gear is chosen, while the intermediate target gear is engaged, will be less than or equal to the rpm of the shaft that, in terms of the engine, engages the torque transmission device of the gear input shaft with the intermediate target gear, provided there is a gear in that subgear which meets that condition and that—if such a gear, that meets this condition, does not exist—the highest gear in this subgear be selected and engaged as intermediate target gear.

The following is provided in a preferred embodiment: after the engagement of an intermediate target gear and a target gear, this target gear be disengaged and another target be engaged, whereby the power train remains engaged. In other words, it can be provided especially that the target gear or the target gears are adapted to the operating states of the motor vehicle. It is furthermore preferred that, after the engagement of an intermediate target gear and a target gear, the intermediate target gear be disengaged and another intermediate target gear be engaged, whereby here again the power train is engaged. In other words, in particular it is provided that, in the phase in which the power train or the first and second torque transmission devices are engaged, the target gear and the intermediate target gear in each case are adopted to operating states of the vehicle. This can for example be done in such a manner that the adaptation always takes place in such a way that the target gear will be adapted as a function of the current vehicle speed or will be so adapted that starting or continuing to drive will be possible in the average rpm range (especially when the target gear is engaged).

In a particularly preferred embodiment, it is provided that the intermediate target gear—at least the initially engaged intermediate target gear—be different from the gear that was engaged as the last one prior to the release of the power train or of the two torque moment transmission devices in the subgear, via which a torque, initiated by the engine, was last transmitted. In a particularly preferred fashion, it is provided that the target gear or the initially engaged target gear corresponds to the gear that was last engaged in the above mentioned fashion prior to the release of the power train.

According to the invention-based method in keeping with the basic idea, it is especially provided that the engine of the motor vehicle, that especially is designed as an internal combustion engine, be accelerated, when it is discovered that an acceleration desire is indicated. Here it can be particularly provided that the acceleration of the engine be started immediately or very closely in terms of time after the recognition of the desire to accelerate.

It can in particular be provided that, when a desire to accelerate is discovered, and when the engagement of the intermediate target gear and/or the target gear has not yet been completed, the engine acceleration is already started, especially immediately or very closely in terms of after the recognition of the desire to accelerate.

Furthermore, when it is found that an acceleration desire is indicated, that particular torque transmission device, which is arranged on the gear input shaft of the subgear, in which the intermediate target gear is engaged, is locked when it is found that an acceleration desire is indicated. This locking of this torque transmission device here of course takes place only to such an extent that this torque transmission device slips or that the rpm of the shaft engaging this transmission device in terms of the engine, in particular, the engine output shaft, will increase faster than the rpm of the gear input shaft of the subgear with the intermediate target gear. This locking of this torque transmission device, which is arranged on the gear input shaft of the subgear with the target gear, takes place in particular only when the intermediate target gear has been engaged. It can then especially be provided that—when an acceleration desire is determined, while the corresponding intermediate target gear of course has not yet been engaged—the locking of the torque transmission device, which is arranged on the gear input shaft with the intermediate target gear, will not take place or will not always take place immediately but that one will wait until this intermediate target here has been engaged. Furthermore it is provided especially that the torque transmission device, that is arranged on the gear input shaft with the target gear, remain engaged for the time being.

In a preferred embodiment—especially in this case—the torque transmission device, that is arranged on the gear input shaft with the current intermediate target gear, will be locked only when or will be so locked that this torque transmission will slip when the shaft, engaging this torque transmission device in terms of the engine, or the engine output shaft, displays an rpm that is greater than the rpm of this gear input shaft so that in particular the vehicle is on traction operation.

The following is provided in a particular preferred fashion: after the locking of the torque transmission device— which is provided on the gear input shaft of the subgear with the intermediate target gear—the rpm of the torque transmission device arranged on the input side and the shaft engaging the torque transmission device, in particular, the engine output shaft, will increase, especially due to the fact that the engine is accelerated as a result of the desire to accelerate. The following is provided in a particularly preferred manner: When the rpm of the engine output shaft is greater than the rpm of the gear input shaft of the other subgear, in other words, the gear input shaft of the subgear with the current target gear, the torque transmission device, associated with the subgear with the current intermediate gear, be engaged and the torque transmission device, which is arranged on the gear input shaft of the subgear with the current target gear, be locked. This engagement and locking takes place especially simultaneously. The releasing and locking actions here for example can take place in the manner of an overshoot circuit such as it is for instance known also for gear changes in the case of dual clutch gears. Here one especially changes from the intermediate target gear into the target gear without any interruption in the traction force.

It should be noted here that the following can also be basically provided: on the input side of one torque transmission device, another shaft will engage, that is, other than on the input side of the other torque transmission device. If that is provided, then of course, it is especially also provided that the two shafts—that are arranged on the input side of these two torque transmission devices—be so connected that they are rotated simultaneously, for which purpose, for example, one can provide a transmission step. The following is especially provided in such a case: the previously mentioned change from intermediate target gear into target gear is triggered with a connection that does not interrupt the traction force when the rpm of the shaft that engages on the input side in the torque transmission device of the subgear with the target gear, is greater than the rpm of the gear input shaft of this subgear. The following can also be provided: the engine output shaft is the shaft that engages the torque transmission device of the first subgear and is the shaft engages the torque transmission device of the second subgear in terms of the engine.

It might be noted that the following is provided especially: the torque transmission device, of which is arranged on the gear input shaft over the subgear with intermediate target gear, between the previously mentioned locking of this torque transmission device as a result of an acceleration desire and the temporarily subsequent release of this torque transmission device, for the purpose of switching into the target gear, always is locked only to such an extent that it cannot completely transmit the moment that is initiated by the engine, in other words, in particular, it slips.

In a particularly preferred manner, it is provided that, when one changes into the target gear, the torque transmission device, which is arranged on the gear input shaft of the subgear with the current target gear, be locked to such an extent that the torque, fed into this torque transmission device in terms of the engine, be essentially transmitted completely or that the rpm of the shaft that engages on the input side and the output side of this torque transmission device be identical.

In a preferred manner it is provided that, after generation or determination of an acceleration signal, the engine be accelerated at least so long until the target gear has been engaged.

According to another idea, there is proposed a method for the control of a power train system of a motor vehicle. Here, the power train system has a power train, an engine, such as an internal combustion engine, for the purpose of driving this power train, as well as a gear device. The gear device has several wheel sets to form gears that can be engaged and disengaged. Furthermore, the gear device has at least one torque transmission device, which, for example, can be designed in the manner already described above. It is provided in a particular preferred manner that this gear device be made as a dual clutch gear. Exemplary embodiments of such a dual clutch gear, that are particularly preferred, have already been touched on and will be further covered below. Furthermore, it is provided especially that the power train system have a drive shaft that is arranged on the side of the power train facing away from the engine and that can be driven by means of the engine via the power train. It is furthermore provided that the power train system have an electronic control device as well as a device, such as a drive pedal, by means of which one can indicate a desire to accelerate. The device, by means of which one can indicate a desire to accelerate, however can also be designed in some other fashion, for example, in such a manner as was already explained earlier.

According to another invention-based idea it is provided that the power train be engaged by means the torque transmission device or devices, something that for instance that can take place to prevent or shorten the thrust operating phases when it is found that the vehicle leaves the traction operation mode toward thrust operation. That can be indicated for example by reducing the drive pedal value, or it can be triggered by the discovery to the effect that such a drive pedal value is diminished. Various other designs preferred by way of example have already been described earlier in conjunction with this releasing or engaging action which, here again, can exist in the method according to this basic idea. In particular, it can also be provided that this method be started only when the power train is engaged.

According to the method based on this idea it is especially provided that the electronic control device, such as an electronic control unit, and for instance, an electronic engine control unit, after the release of the at least one torque transmission device or the two torque transmission devices or the power train and/or when an acceleration desire is indicated—especially a renewed such desire that is indicated or conditioned particularly in the drive pedal value—will generate at least one signal as a result of which the rpm of a shaft located on the side of this engaged torque transmission device that faces toward the engine and that engages especially this torque device, such as the engine output shaft, would be kept close to or greater than or equal to the rpm of the gear input shaft located on the side of this same torque transmission device that faces away from the engine, whereby, furthermore, by means of the electronic control device, one can make sure that the gear input shaft will be connected with that drive shaft via an engaged gear. In gears with parallel power train branches, these are rpm conditions preferably relate to one of the gear input shafts of the subgears.

It should be noted that any combination of the objects claimed by the subclaims is preferred and can be further developed by the developments or features described in the description or shown in the figures. The invention-based methods can also be combined. The invention-based motor vehicle can also be provided with an invention-based control unit.

BRIEF DESCRIPTION OF THE SEVERAL VIEWS OF THE DRAWINGS

The nature and mode of the operation of the present invention will now be more fully described in the following detailed description of the invention taken with the accompanying drawing Figures, in which.

DETAILED DESCRIPTION OF THE INVENTION

Figure 1:
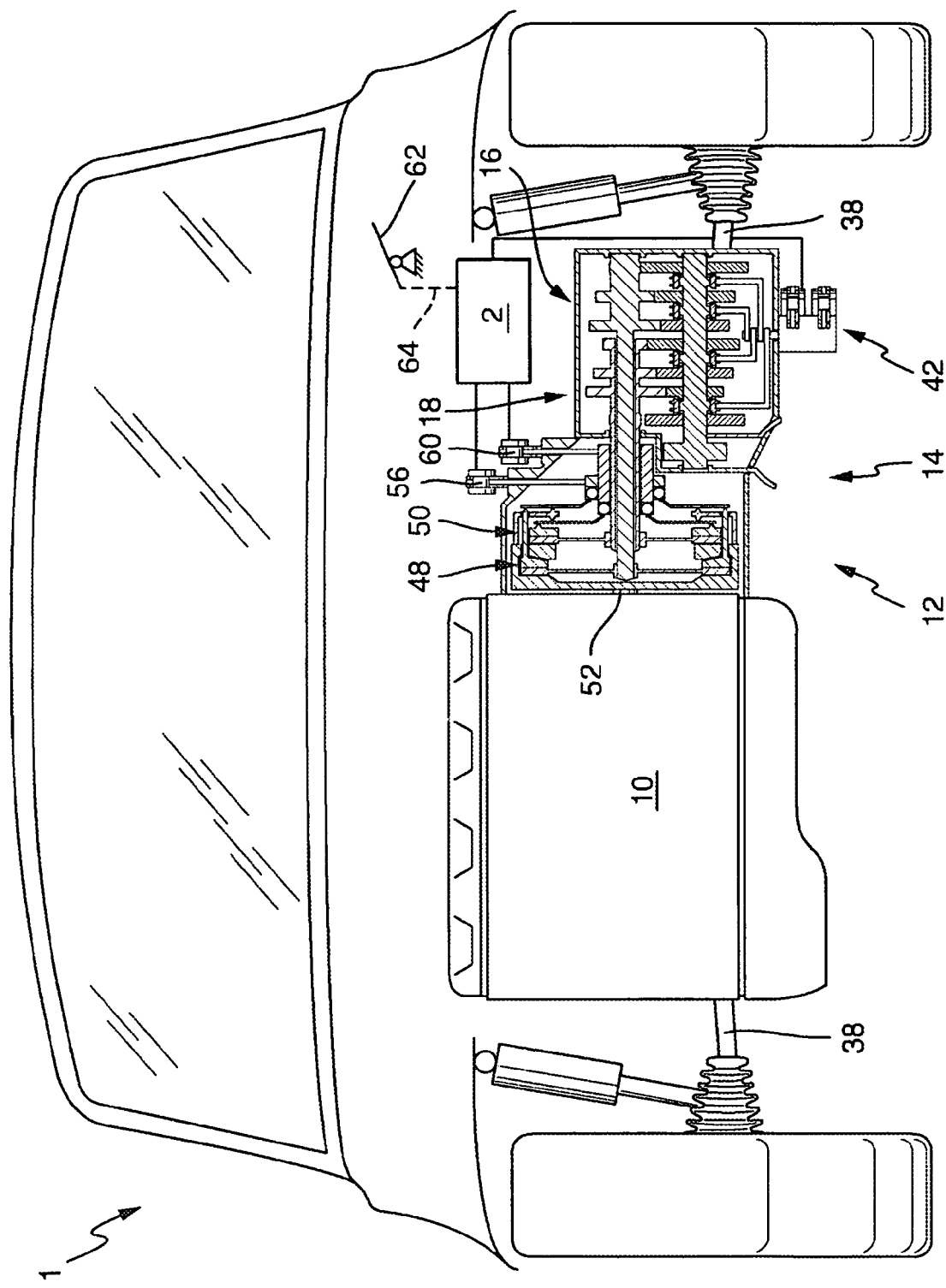
FIG. 1 is an exemplary, invention-based motor vehicle with an exemplary, invention-based motor vehicle with an exemplary invention-based control unit shown in the form of a diagram, where an exemplary invention-based method is also explained with reference to this illustration.
Figure 2:
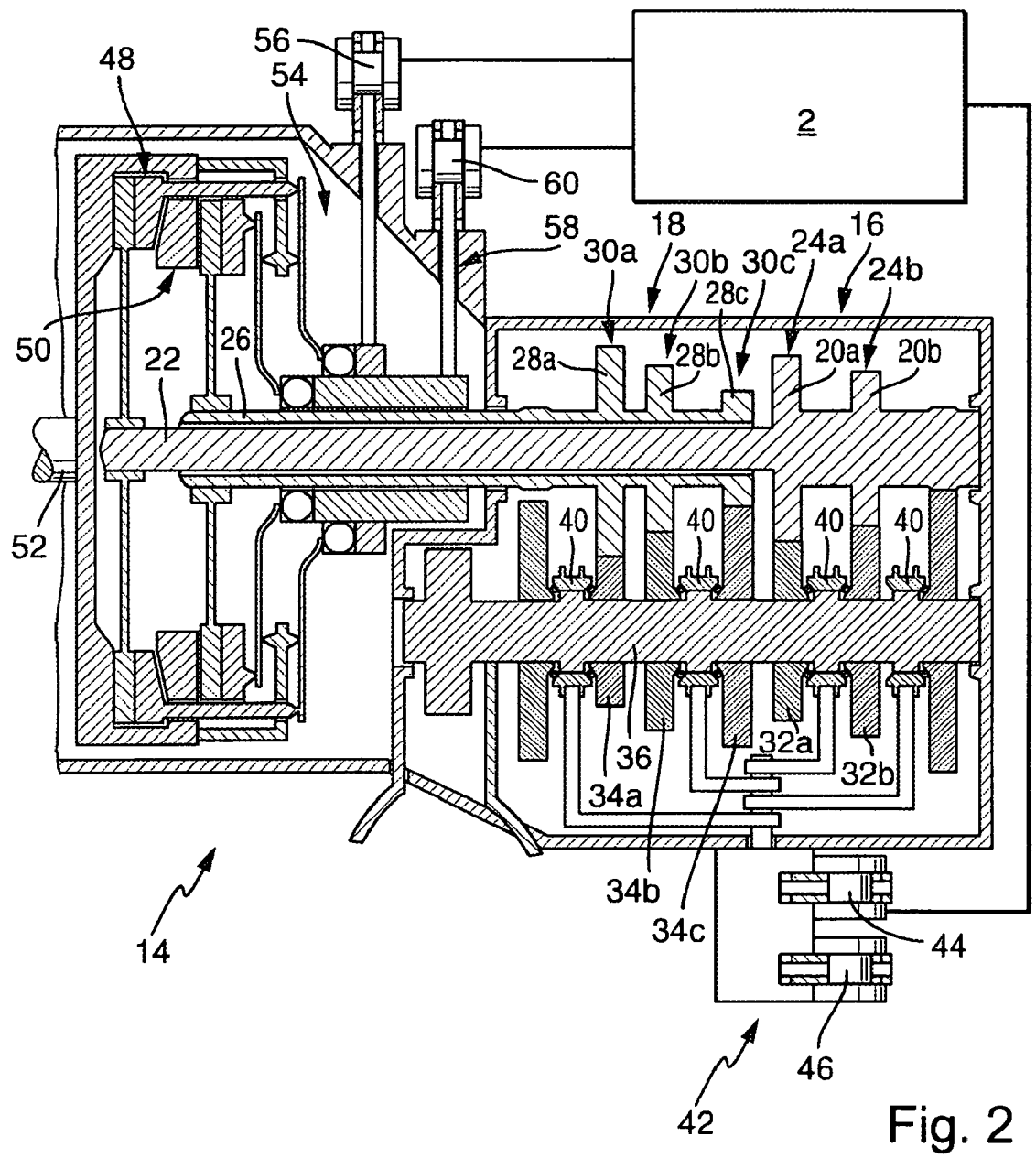
FIG. 2 is an enlarged segment from FIG. 1 in the area of the dual clutch gear.

FIG. 1 shows an exemplary invention based motor vehicle 1 with an exemplary invention based control unit 2.

Motor vehicle 1, shown in FIG. 1, has an engine 10, designed as internal combustion engine, such as, for example, a turbo-diesel engine that can drive a power train 12. Arranged in power train 12 is a gear device 14 that has a first subgear 16 as well as a second subgear 18.

The first subgear 16 and the second subgear 18 are arranged or connected parallel to each other. Gear device 14 is designed as a dual clutch gear. Dual clutch gears have two gear input shafts with one, each, clutch leading to the engine, upon which the gears are arranged alternating according to their size. Adjacent gears in other words can be engaged simultaneously so that a change will take place between them alone by releasing one clutch and locking the other clutch. It is also possible that the gears be so arranged that they will not be arranged alternatingly on these gear input shafts. In the exemplary embodiment, of course, the gears are arranged alternatingly on the gear input shafts.

For this purpose, toothed wheels 20a, 20b are arranged on the first gear input shaft 22 of the first subgear 16—in particular, in a nonrotary manner. Each of these toothed wheels 20a, 20b is a part of a separate wheel set 24a, 24b which in each case is provided to form one gear.

In a corresponding manner, there are arranged, upon or on the second gear input shaft 26 of the second subgear 18, toothed wheels 28a, 28b, 28c—especially in a nonrotary manner—which in each case are part of a wheel case 30a or 30b or 30c.

Wheel sets 24a, 24b, 30a, 30b, 30c are provided for the formation of gears.

Each of the wheel sets 24a, 24b, 30a, 30b, 30c furthermore has a toothed wheel 32a or 32b or 34a or 34b or 34c, where these toothed wheels are on a shaft 36 and can be moved in rotation with respect to that shaft 36. Shaft 36 is arranged on the side of gear input shafts 22, 26 that face away from engine 10.

Shaft 36 is connected—for example, via toothed gear steps—or via a differential of some other interspersed parts, with at least one drive shaft 38 of the motor vehicle. Toothed wheels 32a, 32b, 34a, 34b, 34c are, as mentioned earlier, arranged rotatably on shaft 36 and can be connected in each case with a shaft via sliding sleeves or gear clutches 40. The gear clutches 40 for instance can be or have sliding sleeves or the like.

A gear actor 42 is provided to actuate the gear clutches 40. This gear actor 42 has two electric motors 44, 46, and one of these electric motors can generate a movement for the selection, while the other one can generate a movement for the switching of these electric motors. Electric motors 44, 46 are triggered by the electronic control unit 2.

The double clutch gear 14 has two torque transmission devices 48, 50 which here in each case are made as clutches, specifically especially as friction clutches. These torque transmission devices can be released and locked and can be placed in a state in which they will partly transmit an applied torque. The first torque transmission device 48 is arranged on the first gear input shaft 22 toward the motor or on the motor side, and the second torque transmission device 50 is arranged on the engine side or toward the engine 10 upon the second gear input shaft 26.

The engine output shaft 52 of engine 10 in each case engages in these two clutches 48, 50 on the engine side. To trigger the first clutch 48, there is provided a first clutch actor 54 that has a third electric motor 56. In a corresponding manner, to actuate the second clutch 50, there is provided a second clutch actor 58 that has a fourth electric motor 60. The gear actors and the clutch actors or their particular electric motors are triggered by the gear control 2.

Furthermore, a drive pedal 62 is provided that can be operated by the driver of vehicle 1. Drive pedal 62 can be moved in various positions each of which is matched with drive pedal values. By increasing the drive pedal value, one can indicate that there is a desire to accelerate. This is in particularly so that—when the driver is not stepping on the drive pedal—we are dealing with the drive pedal value "0" and, when the driver completely steps all the way down on the drive pedal, we have pedal value "1"; here, the drive pedal value rises correspondingly in the intermediate positions.

It can be provided, as indicated by line 64, that the drive pedal value be displayed to the electronic control unit 2, specifically, in particular as or by means of an electronic signal. It can be provided that the internal combustion engine 10 also be triggered by the electronic control unit 2.

In the following we will now explain an exemplary method according to a basic idea behind the invention, referring to the figures.

There is a functional mode that, in one or all gears, releases the power train by releasing the first clutch and the second clutch, the moment vehicle leaves traction operation, for example, due to the reduction of the drive pedal position or when driving downhill, as a result of which one prevents a change into thrust operation, in other words, the engine is driven not by the movement of the vehicle. Consequently, the engine rpm will drop, for example, down to idling rpm while the input shaft rpm will be set to the value determined by the engaged gear and the vehicle speed that is possibly influenced by the driver with the help of the brake pedal. It is especially this functional mode that is also referred to as free wheels or neutral idle.

According to the method, during the free wheels or neutral idle function, on the basis or as a function of the current vehicle speed, in spite of the released power train 12, there will always be selected and engaged a target gear in which, with the power train locked, one could drive in the middle rpm range. The gear input shaft of the two gear input shafts, upon which this gear is supplied, hereafter will be referred to as the gear input shaft A. It should be noted in this context that both gear input shafts, alternately, can form the gear input shaft A, although not at the same time.

On the other of the two gear input shafts, which, in each case, will differ from the gear input shaft A, and which will be referred to as gear input shaft B, we now engage a faster gear, in other words, a gear that is higher than the target gear. That gear is also referred to as intermediate target gear. This means that the gear input shaft B will rotate more slowly than the gear input shaft A, upon which the target gear is arranged.

If the driver suddenly wants to accelerate, in other words, when the engine rpm is low, then one can already transmit traction force via this higher gear or via the intermediate target gear. The delay between the increase of the drive pedal value and the onset of traction—which results from the fact that the engine, prior to the locking of a clutch, must be accelerated first of all via the rpm of the gear input shaft belonging to the clutch—will now be correspondingly smaller.

The choice of the gear on the gear input shaft B is done in the following preferred manner: the rpm of this shaft is smaller than or equal to the current engine rpm. If this is not possible, then one sets the highest gear upon that gear input shaft B. If there are several gears on the gear input shaft B, which permit an engine rpm smaller than the current engine rpm, then the smallest of these gears will be engaged (as intermediate target gear) in order to keep the difference between the engine rpm and the shaft rpm of this gear input shaft B as small as possible, and also to keep the energy supply to the clutch as small as possible as the clutch is engaged.

If, during the free wheels or neutral idle function, the driver requires an acceleration by increasing the drive pedal value, then, first of all, both clutches 48, 50 remain engaged, until engine 10 has obtained somewhat higher rpm than the slower of the two input shafts 22, 26, in other words, that of the particular input shaft B. As soon as the engine input shaft 52 has obtained an rpm that corresponds at least to the rpm of the slower of the two gear input shafts 22, 26, in other words, gear input shaft B, or is greater than that rpm, at that point in time, the clutch on shaft B is locked so far that it will transmit a calibrable portion of the supplied engine moment. Depending of the driving situation, that can also happen immediately at the very moment when the drive pedal value is increased. As of that point in time, in other words, after the clutch has been correspondingly locked, the driver will already feel an acceleration.

The clutch on the gear input shaft B here amounts to only a part of the engine moment; therefore, the engine rpm will increase further. The moment it is greater than the rpm of the gear input shaft A, upon which the actual target gear is engaged, then, according to an overshoot circuit, where such an overshoot circuit for example is already know from the parallel gear boxes (PSG-overshoot circuit), the clutch on shaft B is simultaneously released and that of shaft A is locked. After this overshoot, the complete engine moment is transmitted via the target gear or via the subgear with the target gear. The entire engine moment is here available for the acceleration of the vehicle. This complete or entire engine moment in particular is the one that currently can be determined or acquired for the driver of the motor vehicle, provided the engine moment is also supplied for other consumers or subassemblies, such as, for example, the air conditioning system.

This method facilitates a considerably more uniform and definitely earlier commencing buildup of vehicle acceleration in case of acceleration requirements during free wheels or neutral idle when compared to the hitherto employed functional mode that is known to applicant at least on an in-house basis. There—in other words, in the case of the known design—one cannot sense any kind of acceleration, so long as the engine rpm has not yet attained the rpm of the gear input shaft with the target gear. To avoid any major overshoots of the engine rpm when engaging the clutch, one must, in that place—in other words, in the known design—furthermore, as of the moment this target rpm is attained, undertake a negative engine moment interference or one must very quickly—and thus uncomfortably—engage the clutch. The acceleration thus is either definitely more sluggish than would be theoretically possible or it is extremely uncomfortable.

The proposed design or the proposed strategy on the other hand generates a fast acceleration reaction that furthermore is comfortable, that does not generate any major engine rpm overshoots, and that the driver need not clip off the required engine moment.

In a preferred embodiment, the gear is designed as a parallel gear box (PSG). One can also provide that the gear device be designed as automated gear box with an electrical machine (ESG), associated in the power train. Also preferred is a design of the gear device as a so-called noninterruptible gear box (USG) in terms of an automated gear box, where, during a switching process, the torque transmission, which is interrupted between the gear and the drive unit, will at least transmit a submoment via a so-called load clutch. The invention-based method in particular can be implemented in a vehicle with such a gear.

In the following, we will explain some exemplary desings for an invention-based method referring to another basic idea which for example can be imployed also in a vehicle shown in FIG. 1. To achieve a fast reaction to acceleration demands in conjunction with the active free wheels or neutral idle function, the engine rpm must be kept in the vicinity of or above the rpm of the gear input shaft with the gear engaged, because a positively accelerated moment can be transmitted only in case of a positive slip on the clutch. This for example can be achieved in that the engine rpm be raised via the idling rpm. That can be accomplished for example by a requirement to the engine rpm. In other words, it can be provided that, instead of or as a supplement to the use of the target gear and the intermediate target gear, in other words, in particular, an action on the gear itself, there will be action on the engine as such, which will be thus that the engine rpm will be "artificially" raised also during the free wheels or neutral idle function or when the clutch is released, so that clutch in particular will not be kept at its idling rpm. Here is another possibility: first of all, when entering into the free wheels or neutral idle function, one engages a higher target gear where, possibly, after a demand expressed by an acceleration wish, the clutch is actually so locked that the engine moment will be completely transmitted, whereby, subsequently, one switches back into a lower gear without any interruption in the traction force.

The invention based variants can, in a preferred manner, also be combined with a functional mode for routine operation or for gear change which is designed as follows. The traction force is replenished according to this functional mode, in a dual clutch gear, in certain switching situations, via a gear that is higher than the actual target gear. Especially in the case of the so-called intermediate gear boxes, between two gears of the same gear input shaft 22 or 26, during the actual gear change, one can transmit a part of the engine moment via a (mostly higher) gear on the other shaft when the clutch slips. In that way one can prevent an interruption in the traction force. This in other words is a functional mode that is not connected to the re-engagement after the "free wheels or neutral idle" state. A method according to this functional mode for instance can be control in a supplementary manner by the control unit, for the corresponding situations. But this functional mode can also be omitted.

The invention-based method, especially the method according to the first invention-based idea, facilitates a spontaneous and comfortable change from the "free wheels or neutral idle" driving state to the "traction" driving state in dual clutch gears, specifically, especially for vehicles that have relatively sluggish combustion engines. It is especially during the phase, during which the combustion engine is still accelerated to its target rpm or to its clutch engagement rpm that traction force is transmitted via a gear higher than the target gear. Compared to the design that is known to applicant at least on an in-house basis, it now becomes possible to have the acceleration of the vehicle, in response to the driver's desire, take place, spontaneously, with the same or even greater comfort.

In other words, a method is created for the rapid change from free wheels or neutral idle operation, in dual clutch gears. In particular one can also make it possible that, in case of sudden acceleration requirements, by increasing the drive pedal position, during the free wheels or neutral idle function, one can bring about the fastest possible and the most comfortable possible acceleration reaction of the vehicle.

LIST OF REFERENCES 1 motor vehicle
2 electronic control unit
10 engine (internal combustion engine)
12 power train
14 gear device
16 first subgear of 14
18 second subgear of 14
20a toothed wheel
20b toothed wheel
22 first gear input shaft
24a wheel set
24b wheel set
26 second gear input shaft
28a toothed wheel
28b toothed wheel
28c toothed wheel
30a wheel set
30b wheel set
30c wheel set
32a toothed wheel
32b toothed wheel
34a toothed wheel
34b toothed wheel
34c toothed wheel
36 shaft
38 drive shaft of 1
40 gear clutch
42 gear actor
44 electric motor
46 electric motor
48 first torque transmission device
50 second torque transmission device
52 engine output shaft
54 first clutch actor
56 third electric motor
58 second clutch actor
60 fourth electric motor
62 drive pedal
64 broken line

What is claimed is:

1. A method for control of a gear device of a motor vehicle, wherein said gear device is integrated into a motor vehicle power train that can be driven by an engine and is designed as multiple clutch gear, wherein said gear device comprises the following:
   a first subgear with a first gear input shaft and with several wheel sets for the formation of gears that can be engaged and disengaged, wherein a first torque transmission device is provided upon said first gear input shaft; and;
   a second subgear with a second gear input shaft and with several wheel sets for the formation of gears that can be engaged and disengaged, wherein a second torque transmission device is provided upon said second gear input shaft, said method comprising:
   monitoring a signal which indicates whether there is a desire to accelerate;
   engaging the power train by releasing said first and second torque transmission devices;
   selecting and engaging a predetermined target gear in one of said first and second subgears, whereby the power train, during said engagement of said target gear, continues to be engaged;
   selecting and engaging a predetermined intermediate target gear in the other of said two subgears, wherein the power train, during said engagement of said predetermined intermediate target gear, continues to be engaged, wherein said predetermined intermediate target gear is higher than said target gear, so that the rpm of the gear input shaft of said target subgear, is greater than the rpm of the gear input shaft of the subgear in which the current intermediate target gear is engaged;
   accelerating said engine; and,
   locking said torque transmission device that is provided on the gear input shaft of the subgear in which said predetermined intermediate target gear is engaged, when it is found that an acceleration desire is indicated, whereby said torque transmission device is locked only so far that it will slip or that the rpm of the gear that engages said torque transmission device on the engine side will increase faster than the rpm of said gear input shaft of the subgear in which the intermediate target gear is engaged.

2. The method according claim 1, wherein said engagement of the power train takes place by releasing the first and the second torque transmission devices while the vehicle is moving.

3. The method according to claim 1, wherein said engagement of the power train takes place by releasing the first and the second torque transmission devices outside the gear change processes.

4. The method according to claim 1, wherein as said motor vehicle leaves a traction operation and starts a thrust operation due to a reduction of a drive pedal value, said engagement of the power train takes place by releasing the first and second torque transmission devices to prevent or shorten the thrust operation phase.

5. The method according to claim 1, wherein said signal which indicates whether there is a desire to accelerate, is dependent on the position change of a drive pedal of the motor vehicle that can be moved into various positions, wherein drive pedal values are associated with said various positions, and where an acceleration desire is indicated by an increase in the drive pedal value.

6. The method according to claim 1, wherein said target gear in each case is so chosen that one can drive in the middle rpm range.

7. The method according to claim 1, wherein said particular target gear, that is selected and engaged with the power train engaged, is chosen as a function of the current speed of the motor vehicle.

8. The method according to claim 1, wherein said predetermined intermediate target gear is chosen such that the rpm of the gear input shaft of the subgear, in which said predetermined intermediate target gear is selected, when the intermediate gear is engaged, will be less than or equal to the rpm of the engine output shaft that engages the torque transmission device which is arranged on the gear input shaft of said subgear in which said predetermined intermediate target is selected.

9. The method according to claim 8, wherein, when in said subgear, in which the intermediate target gear is engaged, several gears are in existence in which said rpm of the gear input shaft of said subgear is less than or equal to the rpm of the shaft which on the engine side engages in the torque transmission device provided on that gear input shaft, the smallest of these gears is chosen as the intermediate target gear.

10. The method according to claim 1, wherein said intermediate target gear is chosen such that the rpm of the gear input shaft of the subgear of said chosen intermediate target gear, that is less than or equal to the rpm of the shaft that, on the engine side, engages said torque transmission device that is arranged on the gear input shaft of that subgear, provided a gear meeting this condition exists in this subgear, and wherein the highest gear of this subgear is chosen as intermediate target gear, when there is no gear in that subgear that meets this condition with said intermediate target gear engaged.

11. The method according to claim 1, wherein, after said engagement of said predetermined intermediate target gear and a first target gear, said first target gear is disengaged and a second target gear is engaged, while said power train continues to be engaged.

12. The method according to claim 1, wherein, after the engagement of a first predetermined intermediate target gear and said target gear, said first predetermined intermediate target gear is disengaged and a second predetermined intermediate target gear is engaged, while the power train continues to be engaged.

13. The method according to claim 1, wherein said intermediate target gear differs from a previously engaged gear, said previously engaged gear engaged immediately prior to the engagement of the power train in the subgear, via which there was last transmitted a torque initiated by the engine.

14. The method according to claim 1, wherein, after finding an acceleration desire is indicated, said first and said second torque transmission devices will remain engaged and that one of said two torque transmission devices, provided on the gear input shaft of the subgear in which the current intermediate target gear is engaged, will be locked only when the rpm of said engine output shaft, engaging said torque transmission device on said engine side, is greater than or equal to the rpm of said gear input shaft of said subgear in which the current intermediate target gear is engaged in such a manner that the rpm of the engine output shaft, engaging on the engine side in said torque transmission device, will rise faster than the rpm of that gear input shaft.

15. The method according to claim 1, wherein, after the locking of the torque transmission device provided on the gear input shaft of the subgear on the engine side in which the predetermined intermediate target gear is engaged, and when the rpm of the shaft that engages the torque transmission device, and that engages the gear input shaft of the subgear on the side facing away from the engine, in which the current target gear is provided, is greater than the rpm of said gear input shaft of the subgear, in which this current target gear is, the torque transmission device of the subgear with the current intermediate target gear will be engaged and the torque transmission device of the subgear will be locked with the current target gear, whereby this release and locking will take place simultaneously such that the change from the intermediate target gear to the target gear will take place without any interruption in the traction force.

16. The method according claim 15, wherein said torque transmission device, that is arranged on the gear input shaft of the subgear with the current target gear, is at least locked so far that it will not slip or that the complete engine moment will be transmitted via the target gear.

17. The method according to claim 1, wherein said target gear is selected and engaged first and that the intermediate target gear is selected and engaged subsequently.

18. The method according to claim 1, wherein the first intermediate target gear is selected and engaged and that the target gear is selected and engaged subsequently.

19. The method according to claim 1, wherein said multiple clutch gear comprises a dual clutch gear.

20. The method according to claim 1, wherein the gear that engages said torque transmission device on the engine side comprises an engine output shaft.

21. A method for the control of a drive system of a motor vehicle, whereby said drive system comprises:
a power train;
an engine for driving said power train;
a gear device with several wheel sets, wherein said gear device provides gears that can be engaged and disengaged, wherein said gear device has at least one torque transmission device, by means of which the power train or a particular power train branch can be released and locked;
at least one drive shaft that is arranged on the side of the power train facing away from the engine and that can be driven by means of the engine via the power train;
an electronic control unit; and,
a device by means of which the desire to accelerate can be indicated, said method comprising:
engaging said power train by releasing the at least one torque transmission device to prevent or to shorten the thrust operating phases, when it is ascertained that the motor vehicle leaves a traction operation mode toward a thrust operation mode due to a desire to accelerate;
generating at least one signal by means of said electronic control unit before an acceleration desire is indicated, indicating the rpm of an engine output shaft engaging an engaged torque transmission device on the side facing toward the engine is maintained greater than or equal to the rpm of a gear input shaft that engages in said engaged torque transmission device on the side facing away from the engine; and,
ensuring, by means of the electronic control unit, that said gear input shaft is connected to said drive shaft via an engaged gear.

22. The method according to claim 21, wherein said device comprises a drive pedal.

* * * * *